US006606097B1

(12) United States Patent
Fossum (10) Patent No.: US 6,606,097 B1
(45) Date of Patent: Aug. 12, 2003

(54) CIRCUIT FOR GENERATING FRAME BUFFER VALUES

(75) Inventor: Gordon Clyde Fossum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 09/631,715

(22) Filed: Aug. 3, 2000

(51) Int. Cl.[7] ............................. G06T 1/00; G06F 15/00
(52) U.S. Cl. ........................ 345/501; 708/495; 708/204
(58) Field of Search .......................... 345/501; 708/495, 708/496, 497, 204

(56) References Cited

U.S. PATENT DOCUMENTS

| | | | | |
|---|---|---|---|---|
| 5,956,042 A | * | 9/1999 | Tucker et al. | 345/426 |
| 5,995,122 A | * | 11/1999 | Hsieh et al. | 345/561 |
| 6,049,343 A | * | 4/2000 | Abe et al. | 345/501 |
| 2001/0016902 A1 | * | 8/2001 | Abdallah et al. | 712/222 |
| 2002/0126127 A1 | * | 9/2002 | Fox | 345/581 |

* cited by examiner

Primary Examiner—Jeffery Brier
Assistant Examiner—Faranak Fouladi
(74) Attorney, Agent, or Firm—Joseph P. Lally; Mark E. McBurney (57) ABSTRACT

A floating point to fixed point converter suitable for determining values for an n-bit frame buffer of a graphics adapter is disclosed. The converter includes a floating point unit that receives a floating point input value and calculates a floating point adjusted input value from the received value. Comparator circuitry is configured to compare a fixed point portion of the adjusted input value to a fixed point comparison value and to generate a fixed point output value responsive to the result of the comparison. The floating point unit may add a floating point constant to the received input to calculate the adjusted input value. The floating point constant may include a rounding component and a range component. The range component adjusts received values into a range defined by a single floating point exponent value such as the range from 1.0 to 2.0. In one embodiment, the rounding component shifts received values that are within a range of $x/(2^n-1)\pm 1/(2*2^n-1)$ into a range bounded by $x/(2^n-1)$ and $(x+1)/(2^n-1)$ to take advantage of special properties of the adjusted range's boundary values to simplify the comparator circuitry. The comparator circuitry may include a comparator configured to compare the exponent field of the adjusted input value to 0x7F and a comparator that compares the value of a first portion of the adjusted input value mantissa to a second portion of the mantissa. The no converter may produce a frame buffer value of 0x00 if the exponent field is less than 0x7F and a frame buffer value of 0xFF if the exponent field is greater than 0x7F. The converter may generate a frame buffer equal to the value of the first portion of the adjusted input value mantissa if the first portion is greater than the second portion and a frame buffer equal to the value of the first portion decremented by one if the first portion is less than the second portion.

23 Claims, 6 Drawing Sheets

CIRCUIT FOR GENERATING FRAME BUFFER VALUES

BACKGROUND

1. Field of the Present Invention

The present invention relates generally to computer graphics and more particularly to a circuit that efficiently determines fixed point frame buffer values from floating point values.

2. History of Related Art

Graphics display subsystems are almost universally employed in microprocessor based computer systems to facilitate a variety of graphics tasks and applications including computer-assisted drafting, architectural design, simulation trainers for aircraft and other vehicles, molecular modeling, virtual reality applications, and video games. Graphics processors, graphics adapters, and a variety of similarly designed computer products-provide specialized hardware to speed the execution of graphics instructions and rendering of graphic images. These processors and adapters typically include, for example,-circuitry optimized for translating, rotating, and scaling 3D graphic images.

In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

Typically a software application program generates a 3D graphics scene, and provides the scene, along with lighting attributes, to an application programming interface (API) such as the OpenGL® API developed by Silicon Graphics, Inc. Complete documentation of OpenGL® is available in M. Woo et al., *OpenGL Programming Guide: The Official Guide to Learning OpenGL, Version* 1.2 (Addison Wesley Longman, Inc. 1999) and D. Schreiner, *OpenGL Reference Manual, Third Edition: The Official Reference Document to OpenGL, Version* 1.2 (Addison Wesley Longman, Inc. 1999), both of which are incorporated by reference herein.

A 3D graphics scene typically includes of a number of polygons that are delimited by sets of vertices. The vertices are combined to form larger primitives, such as triangles or other polygons. The triangles (or polygons) are combined to form surfaces, and the surfaces are combined to form objects. Each vertex is associated with a set of attributes. Vertex attributes may include a position, including three Cartesian coordinates x, y, and z, a material color, which describes the color of the object to which the vertex belongs, and a normal vector, which describes the direction to which the surface is facing at the vertex. Each vertex may also be associated with texture coordinates and/or an alpha (transparency) value. In addition, the scene itself may be associated with a set of attributes including, as examples, an ambient color that typically describes the amount of ambient light and one or more individual light sources. Each light source has a number of properties associated with it, including a direction, an ambient color, a diffuse color, and a specular color.

Rendering is employed within the graphics system to create two-dimensional image projections of a 3D graphics scene for display on a monitor or other display device. Typically, rendering includes processing geometric primitives (e.g., points, lines, and polygons) by performing one or more of the following operations as needed: transformation, clipping, culling, lighting, fog calculation, and texture coordinate generation. Rendering further includes processing the primitives to determine component pixel values for the display device, a process often referred to specifically as rasterization.

The OpenGL® API specification and other API's such as the graPHIGS API define the allowed vertex and scene attributes and the equations used to determine attribute values. During rasterization, the primitives of a scene (including all of its attributes), are used to determine values (red, green blue, alpha, and stencil) corresponding to each pixel of a display screen. These values are stored in a storage element referred to as the frame buffer. Thus, the frame buffer contains a digital representation of an image that is to be displayed on a display screen.

Floating point computations are usually required to calculate the values to be loaded into the frame buffer. Typically, however, the frame buffer is structured as a set of fixed point data points corresponding to each pixel of the display screen. It is, therefore, usually necessary to convert floating point numbers to fixed point values suitable for storage in the frame buffer. In an 8-bit frame buffer, for example, the "red" frame buffer value for each pixel can assume a value in the range of 0 to 255.

In a conventional rasterization process, the conversion of a floating point number to a fixed point number suitable for storage in an 8-bit register would be performed in software by multiplying the input value by 255, adding a suitable rounding offset such as 0.5 to the value, and truncating the fractional component of the result. The truncated value is then compared to the maximum permiitted value (i.e., 255) and a minimum permitted value. The appropriate limit value is substituted for the value if an overflow or underflow occurs. Finally, the resulting floating point value is converted to a fixed point number. Those familiar with the performance of floating point operations will appreciate that the floating point to fixed point conversion process described could become a performance bottleneck in a demanding graphics application. It would therefore be desirable to implement a circuit capable of producing frame buffer fixed point values from floating point values in less time than required to perform the conversion in software.

SUMMARY OF THE INVENTION

The problems identified above are addressed by a floating point to fixed point converter as disclosed herein that is suitable for determining values for an n-bit frame buffer of a graphics adapter. The converter includes a floating point unit that receives a floating point input value and calculates a floating point adjusted input value from the received value. Comparator circuitry is configured to compare a fixed point portion of the adjusted input value to a fixed point comparison value and to generate a fixed point output value responsive to the result of the comparison. The floating point unit may add a floating point constant to the received input to calculate the adjusted input value. The floating point constant may include a rounding component and a range component. The range component adjusts received values into a range defined by a single floating point exponent value such as the floating point range from 1.0 to 2.0 (which is defined by the exponent value 127 in IEEE floating point format). In one embodiment, the rounding component shifts received values that are within a range of $x/(2^n-1)\pm 1/(2*(2^n-1))$ (which is the floating point range corresponding to a frame buffer value of x) into a range bounded by $x/(2^n-1)$ and $(x+1)/(2^n-1)$ to take advantage of special properties of the adjusted range's boundary values to simplify the comparator circuitry. The comparator circuitry may include a comparator configured to compare the exponent field of the adjusted input value to 0x7F and a comparator that compares the value of a first portion of the adjusted input value mantissa to a second portion of the mantissa. The converter may produce a frame buffer value of 0x00 if the exponent field is less than 0x7F and a frame buffer value of 0xFF if the exponent field is greater than 0x7F. The converter may generate a frame buffer equal to the value of the first portion of the adjusted input value mantissa if the first portion is greater than the second portion and a frame buffer equal to the value of the first portion decremented by one if the first portion is less than the second portion.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Figure 1A:
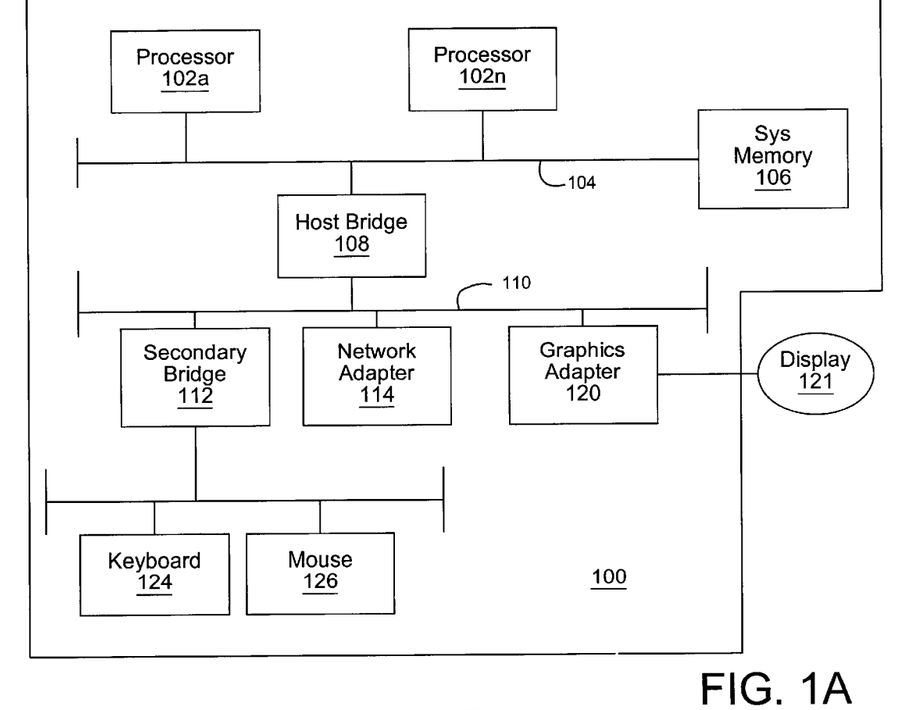
FIGS. 1A and 1B are hardware and software block diagrams of selected elements of a data processing system according to one embodiment of the present invention.

Turning now to the drawings, FIG. 1A is a block diagram of selected hardware elements of a data processing system 100 according to one embodiment of the present invention. In the depicted embodiment, system 100 includes one or more processor(s) 102a through 102n (generically or collectively referred to herein as processor(s) 102) are connected to a system bus 104. Processors 102 may be implemented with any of a variety of microprocessor components including, as examples, PowerPC® processors from IBM Corporation, SPARC® processors from Sun Microsystems, and x86 compatible architectures such as the Pentium® family of processors from Intel Corporation and the Athlon® family of processors from Advanced Micro Devices, Inc.

A system memory (RAM) 106 is accessible to processors 102 via system bus 104. A host bridge 108 is connected between system bus 104 and an IO bus 110. IO bus 110 is typically implemented as a PCI bus (as specified in *PCI Local Bus Specification Rev.* 2.2 available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 112 that provides support for legacy IO devices such as a keyboard 124 and a mouse 126. System 100 further includes a graphics adapter 120 connected to IO bus 110. The graphics adapter 120 is enabled to process graphics data received via IO bus 110 and typically includes a video controller that controls the image displayed on a display device 121.

Figure 1B:
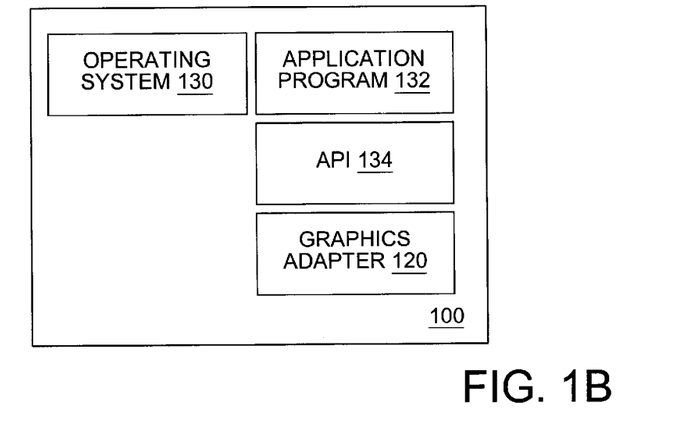

Referring now to FIG. 1B, a conceptual illustration of the system software relevant to the present disclosure is depicted. During system operation, system memory 106 may include all or portions of an operating system 130. Suitable operating systems include the AIX® operating system from IBM Corporation (or another Unix derivative operating system), a Windows® family operating system from Microsoft, or a network operating system such as JavaOS® from Sun Microsystems. An application program 132 generates graphics scenes that are passed to an API 134. In an embodiment particularly relevant to the present disclosure, API 134 may be the OpenGL® API or the graPHIGS API that will be familiar to those in the field of 3D computer graphics. API 134 processes graphics scenes generated by application program 132 and, via graphics adapter 120, maintains the contents of a video display screen, plotter, or other suitable output device.

Figure 2:
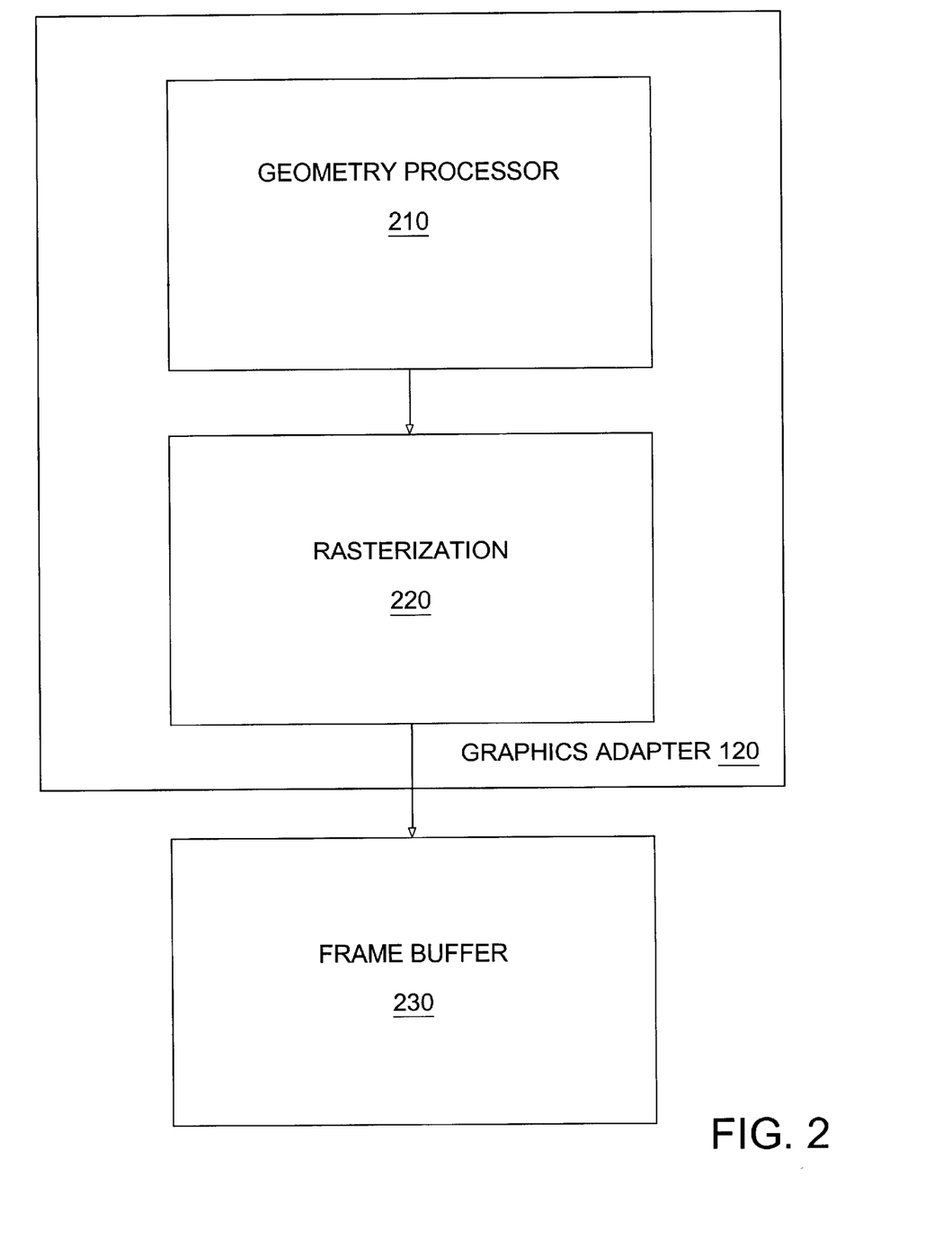
FIG. 2 is a block diagram of an embodiment of the graphics adapter in FIG. 1A.

As depicted in FIG. 2, graphics adapter 120 includes a geometry processor 210 and a rasterization portion (rasterizer) 220. The geometry processor 210 performs complex calculations in response to data received from API 134 to generate the attributes specified by API 134. Rasterizer 220 determines pixel values for the display device based upon information received from geometry processor 210 and maintains the contents of a frame buffer 230 or other suitable graphics storage facility. Frame buffer 230 stores a representation of an image that is displayed on the screen of a display device. Frame buffer 230 is typically integrated into graphics adapter 120, but may comprise a separate unit.

Figure 3:
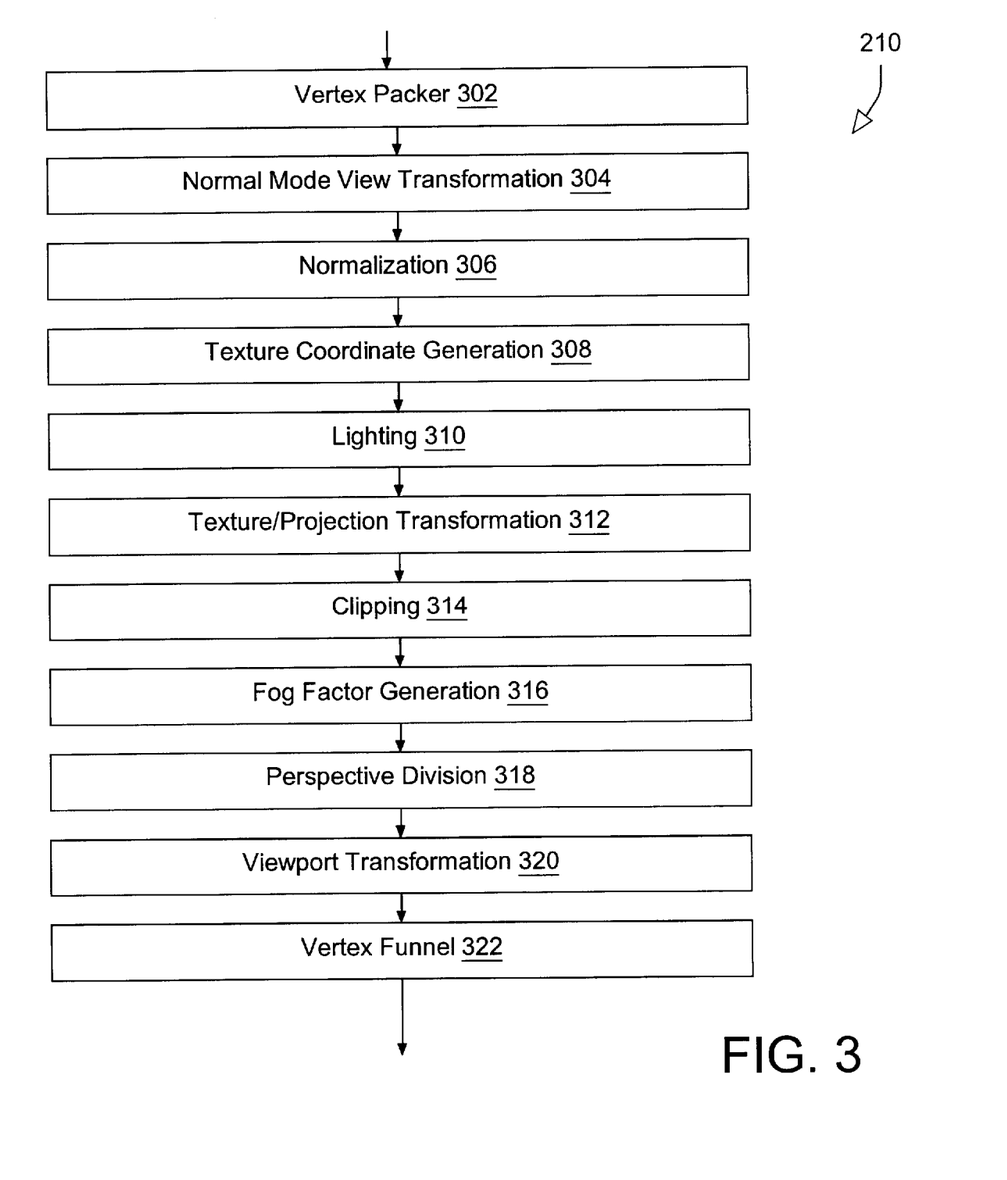
FIG. 3 is a block diagram of an embodiment of a geometry pipeline of the graphics adapter of FIG. 2.

Referring now to FIG. 3, a simplified block diagram of one embodiment of a geometry processor (also referred to as geometry pipeline) 210 is presented. In the depicted embodiment, geometry pipeline 210 may receive data generated by API 134. In one embodiment, geometry processor 210 operates on 64-bit segments of data. Initially, object coordinates are received from API 134 by vertex packer 302, which is responsible for gathering the vertex fragments and storing them in the appropriate field. After the fragments have been stored, the vertex packer sends the entire vertex down geometry pipeline 210.

Vertex packer 302 forwards object coordinates to normal/model view transformation stage 304 where the normal vector is transformed from object space into eye space and the object coordinates are transformed into eye coordinates by translating, scaling, and rotating objects. The normalization stage 306 changes a normal vector to a vector of unit length (i.e., a vector having a magnitude of 1.0), while preserving the direction of the original vector. The texture coordinate generation block 308, as its name implies, is responsible for generating object linear, eye linear, or spherical texture coordinates.

The lighting stage 310 generates the color of each vertex of an object based on the orientation of the object and its material properties as well as the properties of the scene and any light sources that are defined. Texture/projection transformation stage 312 transforms texture coordinates by translating, scaling, and rotating objects and moves objects into a viewing volume by transforming eye coordinates into clip coordinates by translating, rotating, and scaling objects. Perspective projection makes objects that are further away from the viewer appear smaller whereas orthogonal projection does not.

Clipping stage 314 clips objects to a defined viewing volume while fog factor generation stage 316 makes objects fade into the distance by making objects further from the viewer less visible than objects closer to the viewer. The perspective division stage 318 transforms clip coordinates to normalized device coordinates [−1,+1] by dividing by the 4th coordinate (the W coordinate). The view transformation stage 320 facilitates the rasterization process by transforming normalized device coordinates into screen or window coordinates. Finally, the vertex funnel 322 sends the relevant fragments of the vertex to the raster interface sequentially.

The rasterizer 220 receives data from geometry processor 210 and sets frame buffer values based on the received information. For purposes of this disclosure, an 8-bit frame buffer is assumed although frame buffers with greater or less resolution are possible. In an 8-bit frame buffer, each frame buffer component can assume one of 255 different states. In an OpenGL® environment, each pixel is associated with a red, green, blue, alpha, and stencil frame buffer components. Frequently, the values received from geometry processor 210 are represented as floating point numbers. Since each frame buffer value must be represented with 8 bits of information, a fast floating point to fixed point conversion is desirable in rasterizer 220.

Almost universally, floating point numbers are represented in IEEE floating point format. In single precision IEEE floating point, a number is represented in 32 bits (b0–b31), where b0 is a sign bit (S), bits 1–8 are exponent bits (EXP), and bits 9–31 are mantissa bits (M). A value (V) in the range of $2^{-127}$ to $2^{127}$ is stored in IEEE single precision floating point such that $V=-1^{S}*2^{(EXP-127)}*1.M$. (In addition, the format identifies special cases for +/−0, +/−infinity, undefined numbers, and denormalized numbers (numbers less than $2^{-127}$)). The goal of the present invention is to convert an IEEE floating point value to a fixed point value in the range of 0 to $2^n-1$, where n is the depth of the frame buffer, suitable for storage in the frame buffer of a graphics adapter. In a conventional adapter, the conversion may be achieved by multiplying the input value by 2−1, adding a rounding offset, truncating, clamping the truncated value between 0 and 2−1, and converting the clamped value to an integer. The present invention contemplates a circuit capable of determining the converted fixed point value in fewer processor cycles than required to make the conversion in conventional graphics adapters.

Generally speaking, the floating point to fixed point conversion circuit contemplated herein receives a floating point input value an converts the input value to a fixed point value in the range of 0 to $2^n-1$ (i.e., 0 to 255 for an 8-bit frame buffer). The circuit utilizes a single floating point calculation to obtain an adjusted input value (in 32-bit floating point format) from the received input value. The bits comprising the adjusted floating point value are then manipulated to determine whether the received input value is less than 0 or greater than 1. If so, the fixed point value falls out automatically (as 0x00 or 0xFF). If the received input value is in the range of 0 to 1, the mantissa bits of the adjusted input value are used to determine the appropriate fixed point value.

Figure 4:
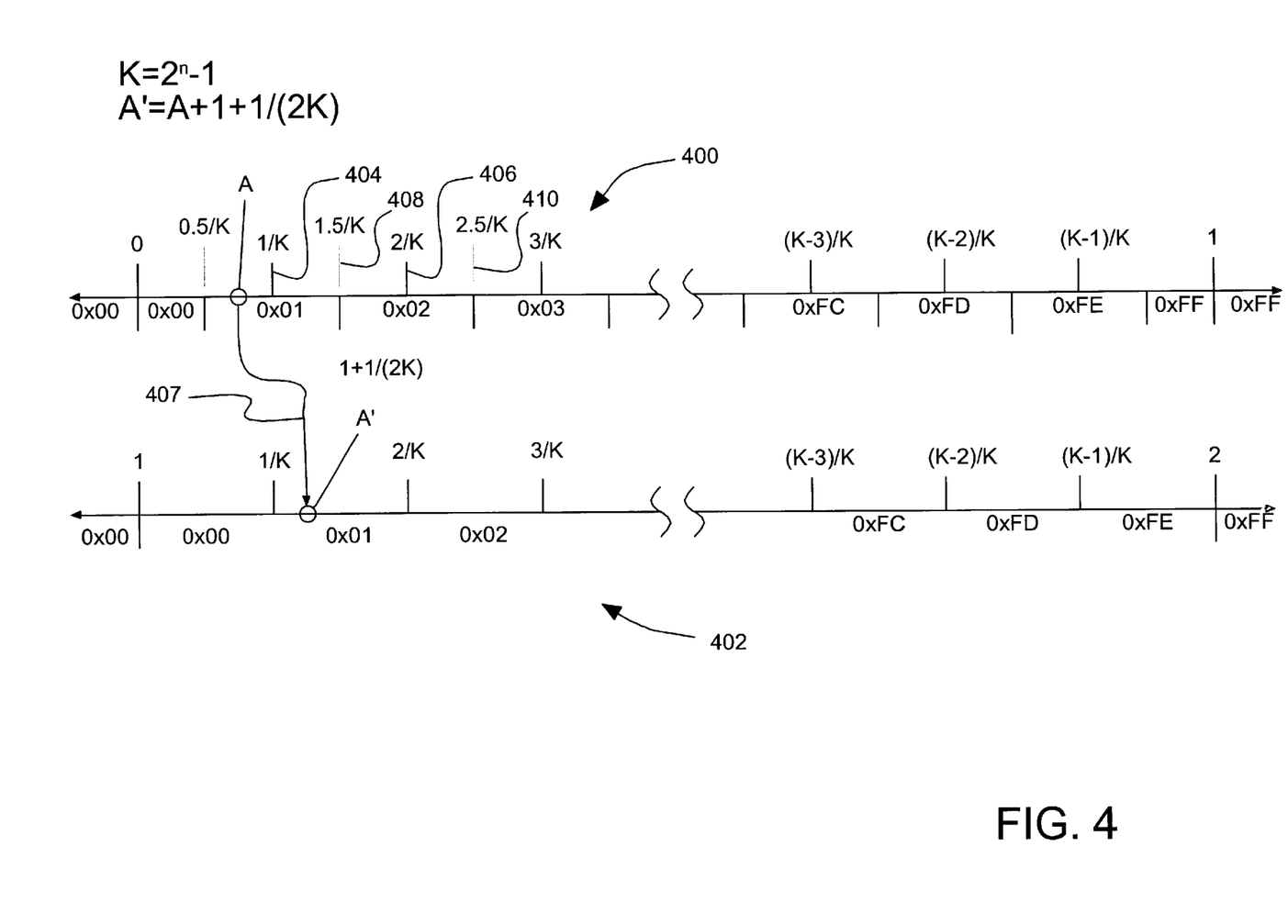
FIG. 4 illustrates a portion of a floating point to fixed point conversion according to one embodiment of the invention.

Referring now to FIG. 4, an illustration of a portion of the conversion process is described to highlight aspects of the invention. In FIG. 4, a first number line 400 and a second number line 402 are depicted. First number line 400 indicates the location of a randomly specified input value A somewhere in the range of 0 to 1. It is assumed that input values less than 0 are clamped to a frame buffer value (fixed point value) of 0x00 and that input values of greater than 1 are clamped to a frame buffer value (fixed point value of 0xFF. Thus, the numbers of concern are between 0 and 1.

First number line 400 is divided into K equidistant segments where:

$$K=2^n-1.$$

Thus, a first segment indicated by reference numeral 404 represents the value 1/255 for an 8-bit frame buffer, a second segment 406 represents 2/255 and so forth. In the OpenGL® API, the frame buffer representation of the floating point value $x/(2^n-1)$, where x varies from 0 to $2^n-1$, is x. The value 1.0, for example, is represented in an 8-bit frame buffer as 0xFF. As depicted in FIG. 4, each of the available 256 frame buffer codes covers a range centered around a value of x/255. The frame buffer value 0x02, as an example, should represent a range of floating point values that has a width of 1/255 and is centered about 2/255. In other words, the floating point range corresponding to the frame buffer value 0x02 extends from 1.5/255 to 2.5/255 (or from 3/510 to 5/510). The boundaries of the range of floating point values corresponding to the frame buffer value 0x02 is indicated in FIG. 2 by reference numerals 408 and 410. In this manner, each frame buffer value x corresponds to a floating point range of values extending from a lower boundary of (x/K)−(1/(2K)) to an upper boundary of (x/K)+(1/(2K)), where $K=2^n-1$.

Achieving a fast floating point to fixed point conversion in the present invention is based on the recognition that (1) it is easier to determine if a floating point formatted number is in the range 1 to 2 than it is to determine the number is in the range of 0 to 1 and (2) it is easier to no compare a floating point formatted number to a value x/K than it is to compare the value to x/K±1(2K). More specifically, determining whether a floating point value is in the range of 1 to 2 can be achieved with a fixed point comparison of the values exponent bits. Similarly, comparing a floating point value to a value of $x/(2^n-1)$ can be accomplished with a sequence of fixed point operations using the floating point value's mantissa bits. The present invention contemplates a circuit that adjusts a received floating point formatted value and then performs a series of fixed point operations on the adjusted floating point value to determine the correct frame buffer code.

As suggested by the foregoing discussion, the invention calculates an adjusted input value from the received input value by adding an offset to the received value. In the preferred embodiment, the offset includes a first component (the range component) that adjusts received values that are in the range of 0 to 1 to an adjusted range that is defined by a single floating point exponent value. In one embodiment, the range component of the offset is floating point 1.0, which adjusts received values that are in the range of [0,1) into a range of [1,2). (In floating point format, the range of [1,2) comprises the range of values that have a floating point exponent field of 0x7F). The adjustment offset includes a rounding component that is equal to the quantity 1/(2K) where $K=2^n-1$ and n is the depth of the frame buffer (i.e., the number of bits in each frame buffer value). Thus, for the case of an 8-bit frame buffer, the adjusted input value is derived from the received input value by adding the floating point quantity 1+1/510 to the received value. The rounding component has the effect of shifting values that are within a floating point range corresponding to a frame buffer code of x into an adjusted range bounded by floating point values $x/(2^n-1)$ and $(x+1)/(2^n-1)$. The invention advantageously converts the received floating point values into this adjusted range because the boundaries of the adjusted are detectable by inspection of a floating point formatted number's mantissa bits.

Returning now to FIG. 4, a value A indicated on line number 400 represents a received floating point formatted value that must be converted to an appropriate frame buffer value. Initially, the value A is converted into an adjusted input value A' is represented by line 407 leading from point A in number line 400 to point A' in number line 402. In one embodiment highly suitable for use with the OpenGL® API and the IEEE floating point format specification, the value A' is offset from the value A by a value of 1+1/(2K), where $K=2^n-1$. In the illustration, the point as corresponds to a frame buffer value of 0x01 because point A is in the range of 0.5/K to 1.5/K. The rounding component of the offset value (i.e., the 1/(2K) component) has the effect of shifting point all points A that are in the range of 0.5/K to 1.5/K into a range bounded by 1/K to 2/K while the remaining component of the offset has the effect of shifting all values bounded by 0 and 1 into a range bounded by 1 and 2. Thus, a comparison between A' and its lower boundary x/K yields the same result as a comparison between A and its lower boundary (x/K)−(1/(2K)). Similarly, determining whether A is in the range of 0 to 1, yield the same result as determining whether A' is in the range of 1 to 2 (except for cases in which A is just slightly less than 1, i.e., A+(1/(2K))>1, which are handled by inspection of the exponent and for cases in which A is slightly less than 0, i.e., 0<A+(1/(2K))<1/(2K), which are handled by inspection of the sign bit, as described in greater detail below.

Figure 5:
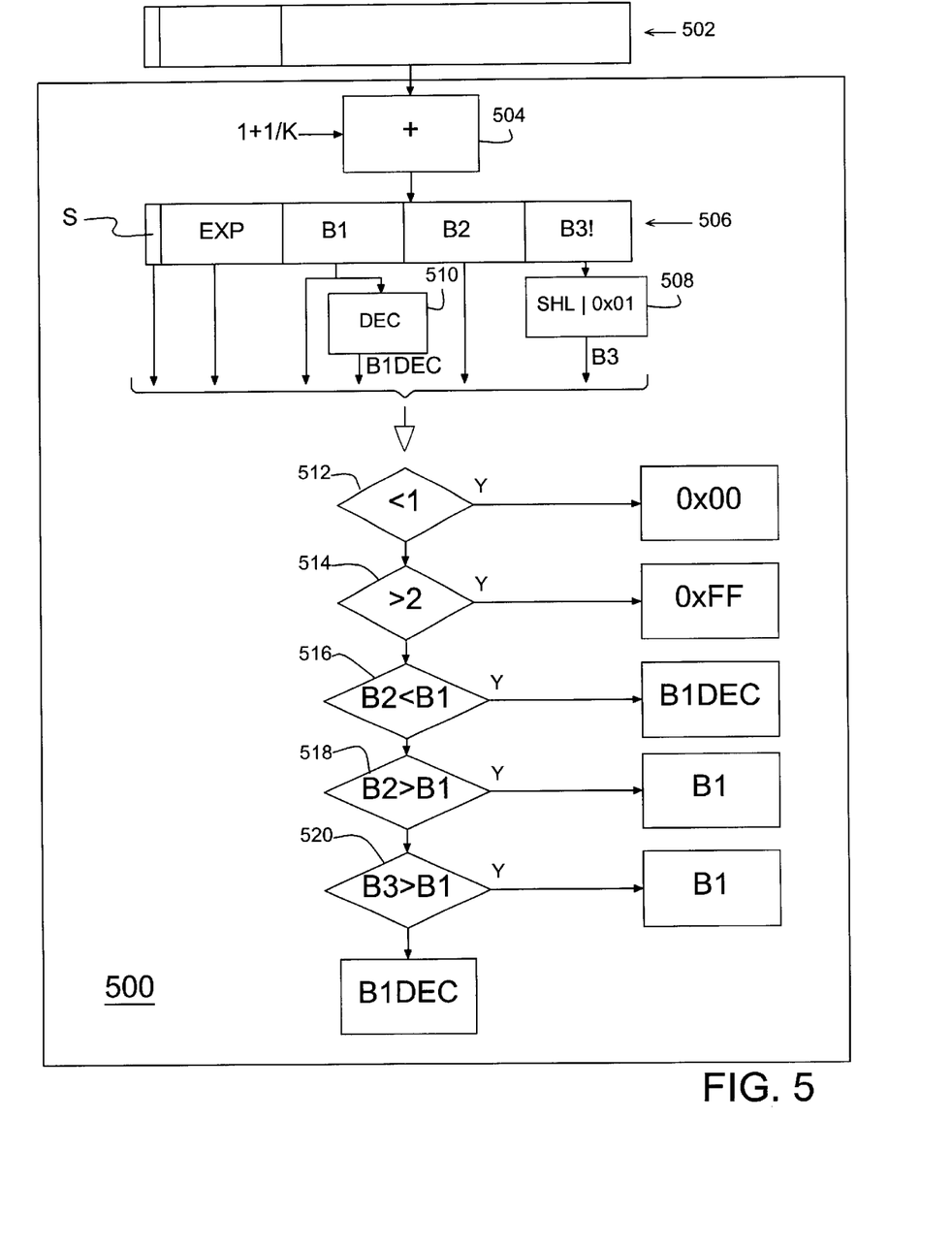
FIG. 5 is a diagram of a floating point to fixed point converter circuit according to one embodiment of the invention.

Referring now to FIG. 5, a diagram of a floating point to fixed point converter circuit 500 suitable for determining fixed point frame buffer values in response to receiving a floating point formatted input value is described. In the depicted embodiment converter circuit 500 is configured to receive a floating point formatted value 502 indicative of the value of a frame buffer component. The received value 502 is initially transformed by adding the floating point constant 1+1/(2K) to the received value with floating point unit 504 to calculate an adjusted input value 506. Adjusted input value 506, as a floating point formatted value, includes a sign bit S, an exponent field (EXP) of 8 bits, and a 23-bit mantissa field which is treated, for purposes of this disclosure, as comprising three segments, namely, a B1 segment consisting of bits 9–16 of adjusted value 506, a B2 segment consisting of bits 17–24, and a B3! segment consisting of bits 25–31 (notice that the B3! segment is just 7 bits wide whereas segments B1 and B2 are 8-bit quantities.

Before proceeding, it should be noted that the binary representation of a value $x/(2^n-1)$, where x and n are integers, is a repeating fraction with a periodicy of n bits, where each n-bit segment evaluates to the quantity x. Thus, for example, the value 2/7 represented in binary is 0.010 010 010 10 0010 . . . b, which consists of a series of 3-bit fields ($7=(2^3-1)$), where each 3-bit field has the value 010b, which evaluates to a decimal equivalent of 2. For n=8, any value x/255 is represented by a series of repeating 8-bit strings where each string evaluates to x. Thus, 162/255 in hexadecimal is 0x 0.A2A2A2 . . . since 0xA2=162. Thus, comparing a random value to a value x/255 is relatively straight forward. If the first 8 bits of the random value evaluate to a quantity that is greater or less than x, the random value is respectively greater or less than x/255. If the first 8 bits are equal to x, evaluate the second set of 8 bits along the same guidelines. If the second set of 8 bits is equal to x, evaluate the third set of 8 bits and so forth. Thus, inspection reveals, for example, that 0x0.0F0F0E<15/255 and 0x0.1A1A20>26/255.

Returning to FIG. 5, the quantities B1 and B2 represent respectively the first and second 8-bit segments of the adjusted input value 506. The quantity B3! is only a 7-bit quantity since the mantissa of a single precision floating point value includes only 23 bits. To facilitate the determination of the frame buffer value, circuit 500 converts the quantity B3! to an 8-bit quantity B3 by padding B3! with a low order bit. To accomplish this, circuit 500 as depicted includes a padding block 508 that effectively shifts the 7-bit quantity B3! by 1 bit and sets the low order bit to 1. Thus, in the depicted embodiment, B3=2*B3!+1.

Also shown in FIG. 5 is a decrementing block 510 that decrements B1 to produce a value indicated in FIG. 5 as B1DEC. The B1DEC value is generated because it represents one of four possible frame buffer values that circuit 500 will generate, namely, 0x00, 0xFF, B1, and B1DEC. The 0x00 and 0xFF cases are boundary conditions indicating received values that exceed the range of [0,1). The only other choices for the frame buffer value corresponding to adjusted value 506 are B1 and B1DEC since, as discussed above, the first eight bits (i.e., B1) of adjusted value 506 represent the corresponding frame buffer value except in those cases when a successive 8-bit portion of the adjusted (i.e., B2 or B3) are less than B1, in which case the frame buffer value is B1−1.

With the S, EXP, B1, and B2 components of adjusted value 506 and the B3 component produced by logic block 508, circuit 500 has generated all the values needed to determine the appropriate frame buffer value corresponding to the received input value 502. The illustration of FIG. 5 represents a functional flow of the decision process used to determine the appropriate frame buffer value. The circuit may be implemented with logic gates that execute in parallel with one another to reduce the number of gates delays required to determine the value. Thus, although the embodiment depicted in FIG. 5 indicates block 512 in which the adjusted value is compared to 1 and a second block 514 in which the adjusted value 506 is compared to 2, the circuit is intended to cover embodiments in which the comparisons may be made simultaneously.

In a logic block indicated by reference numeral 512, circuit 500 determines if the adjusted input value 506 is less than 1. If it is less than 1, a boundary condition exists and the frame buffer value is forced to its lower limit of 0x00. Adjusted input value 506 is less than 1 if (a) it is less than 0 or (b) it is less than 1, but greater than equal to 0. Determining condition (a) is indicated by the sign bit S. If S is 1, the adjusted input value is negative and, therefore, the received input value is also negative. If the sign bit S is 0, a lower boundary condition could still exist if the adjusted input value is less than 1. Circuit 500 makes this determination based by comparing the exponent field EXP to 0x7F (127). Since all floating point values in the range of [1,2) have a floating point formatted exponent field of 0x7F, any value with an exponent field of less than 0x7F is less than 1. If the adjusted input value is less than 1, the received input value 502 must be less than 0 and the corresponding frame buffer value should is forced to 0x00. In logic block 514, circuit 500 determines if adjusted input value 506 is greater than 2 by comparing the exponent field EXP to 0x7F. If EXP>0x7F, adjusted input value is greater than 2 and the corresponding frame buffer value is set to 0xFF.

If the exponent field EXP is equal to 0x7F, the adjusted input value is in the range of [1,2) and the mantissa of the adjusted input value is examined to determine the appropriate frame buffer value. As described previously, the offset of 1/(2K) added to received input value 502 forces the mantissa of adjusted input value 506 permits the determination of the appropriate frame buffer value based upon boundaries of the form 1/K, 2/K, . . . and so forth. To determine within which range the adjusted input value lies, it is only necessary to compare the segment B1 of adjusted input value 506 to the second segment B2 and, if necessary, to third segment B3.

For non-boundary condition cases, the B1 segment of adjusted input value 506 narrows the possible frame buffer values to just two candidates, namely, a frame buffer value of B1 and a frame buffer value of B1−1 (B1DEC). If the B1 segment of adjusted input value 506 has a value of x, the possible frame buffer values are x and x−1. The frame buffer value of x is chosen if the B2 segment values is greater than B1, or if the B1 and B2 segment values are equal and the B3 segment value is greater than B1. Otherwise, the B1DEC is selected as the frame buffer value.

The depicted embodiment of circuit 500 implementation thus includes a logic block 516 in which circuit 500 compares the B1 segment value to the B2 segment value. If the B2 segment value is less than the B1 segment value, the adjusted input value 506 must be less than the value B1/255 and, accordingly, the received input value must be less than B1/255−1/510. Thus, the received input value should be converted to a frame buffer value of B1−1. If the B2 segment value is greater than the B1 segment value (block 518), the frame buffer value is set to B1. If the B2 segment value is equal to the B1 segment value, the B3 segment value is compared to B1 in logic block 520. If B3 is greater than B1, the frame buffer is set to B1 while, if B3 is less than or equal to B1, the frame buffer is set to B1DEC.

Figure 6:
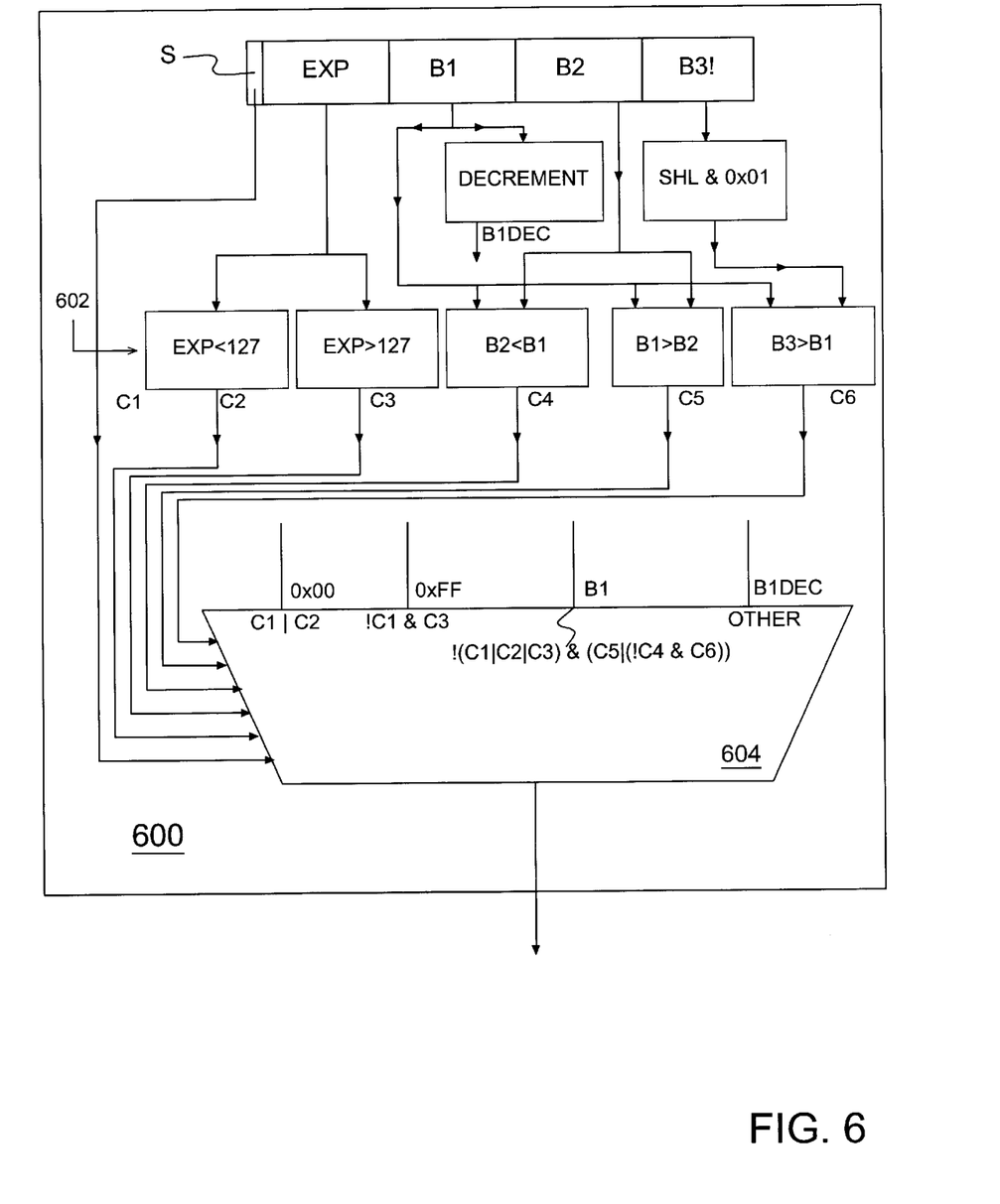
FIG. 6 is a diagram of a floating point to fixed point converter circuit according to one embodiment of the invention.

FIG. 6 illustrates a possible implementation of a circuit 600 capable of performing as circuit 500 depicted in FIG. 5. In the embodiment illustrated in FIG. 6, circuit 600 includes a logic block 508 for producing the 8-bit B3 segment from the 7-bit B3! value, and a logic block 510 for producing the B1DEC value from B1 as was the case for circuit 500. In addition, circuit 600 includes comparator circuitry 602 comprising a row of parallel, fixed point comparators that determine a set of select bits C1, C2, C3, C4, C5, and C6 that provide the select inputs to a multiplexer 604. The select input bits C1 through C6 determine which of possible frame buffer values is selected for storage in the frame buffer. In this manner, circuit 600 is enabled to calculate a fixed point output value suitable for storage in the frame buffer in response to the result of the comparisons made by comparator circuitry 602.

In the depicted embodiment, the C1 bit is equivalent to the sign bit S of adjusted input value 506 and indicates whether the adjusted input value is less than 0. The C2 bit indicates if the exponent field EXP is less than 0x7F (thereby indicating a lower boundary condition), while C2 bit indicates if EXP is greater than 0x7F (thereby indicating an upper boundary condition. The bits C4, C5, and C6 respectively indicate whether the B1 segment of adjusted input value 506 is less than the B2 segment, greater than the B2 segment, and less than the B3 segment.

Multiplexer 604 receives each of the select bits C1 through C6 and, based upon the state of those bits, selects one of four frame buffer values for storage in the graphics adapter frame buffer. If either C1 or C2 are true, the adjusted input value is less than 1 and the lower limit frame buffer value of 0x00 is selected for storage in the frame buffer. If the C3 is true, the adjusted input value is greater than 2 and the upper limit frame buffer value of 0xFF is selected. If neither C1, C2, nor C3 are true, multiplexer 604 selects B1 as the frame buffer value is B1>B2 or if B1=B2 and B1>B3. If none of the foregoing conditions is true, multiplexer 604 is configured to select B1DEC as the value for storage in the frame buffer.

It will be apparent to those skilled in the art having the benefit of this disclosure that the present invention contemplates a hardware implemented clipping stage in the geometry pipeline of a graphics adapter. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A floating point to fixed point converter, comprising:
 a floating point unit configured to receive a floating point input value and enabled to calculate a floating point adjusted input value from the received value wherein calculating the adjusted input value includes adding a floating point constant value to the received input value;
 comparator circuitry configured to compare a fixed point portion of the adjusted input value to a fixed point comparison value; and
 wherein the converter is enabled to generate a fixed point output value responsive to the result of the comparison.

2. The converter of claim 1, wherein the floating point constant value includes a rounding component and a range component, wherein the range component adjusts received values into a range defined by a single floating point exponent value.

3. The converter of claim 2, wherein the range component is equal to 1.0.

4. The converter of claim 2, wherein the output of the converter is suitable for storage in a frame buffer and wherein the rounding component shifts received values that are within a floating point range corresponding to a frame buffer code of x into an adjusted range bounded by floating point values $x/(2^n-1)$ and $(x+1)/(2^n-1)$, where n is the number of bits in each frame buffer value.

5. The converter of claim 4, wherein the rounding component is equal to $0.5(2n-1)^{-1}$.

6. A floating point to fixed point converter, comprising:
 a floating point unit configured to receive a floating point input value and enabled to calculate a floating point adjusted input value from the received value;
 comparator circuitry configured to compare a fixed point portion of the adjusted input value to a fixed point comparison value;

wherein the converter is enabled to generate a fixed point output value responsive to the result of the comparison; and wherein the comparator circuitry includes a comparator configured to compare the exponent field of the adjusted input value to 0x7F.

7. The converter of claim 6, wherein the converter is configured to produce a frame buffer value of 0x00 if the exponent field is less than 0x7F.

8. The converter of claim 6, wherein the converter is configured to produce a frame buffer value of 0xFF if the exponent field is greater than 0x7F.

9. The converter of claim 1, wherein the converter is configured to produce a frame buffer value of 0x00 if the sign bit of the adjusted input value is 1.

10. The converter of claim 1, wherein the comparator circuitry includes a comparator that compares the value of a first portion of the adjusted input value mantissa to a second portion of the adjusted input value mantissa.

11. The converter of claim 10, wherein the first portion of the adjusted input value mantissa comprises the high order 8 bits (bits 9 through 16) of the mantissa and the second portion comprises the next high order 8 bits (bits 17 through 24).

12. The converter of claim 10, wherein the converter is configured to generated a frame buffer equal to the value of the first portion of the adjusted input value mantissa if the first portion is greater than the second portion.

13. The converter of claim 10, wherein the converter is configured to generated a frame buffer equal to the value of the first portion of the adjusted input value mantissa decremented by one if the first portion is less than the second portion.

14. The converter of claim 10, wherein the converted is configured to generate a frame buffer value based on a comparison between the first portion of the adjusted input value mantissa and a value derived from a third portion of the mantissa if the value of the first portion equals the value of second portion.

15. The converter of claim 14, wherein the value derived from the third portion includes the low order 7 bits (bits 25 through 31) of the adjusted input value mantissa.

16. A graphics adapter including a geometry processor and a rasterizer, wherein the rasterizer includes a floating point to fixed point converter, comprising:

a floating point unit configured to receive a floating point input value and enabled to calculate a floating point adjusted input value from the received value wherein calculating the adjusted input value includes adding a floating point constant value to the received input value;

comparator circuitry configured to compare a fixed point portion of the adjusted input value to a fixed point comparison value; and wherein the converter is enabled to generate a fixed point output value responsive to the result of the comparison.

17. The graphics adapter of claim 1, wherein the floating point constant value includes a rounding component and a range component, wherein the range component adjusts received values into a range defined by a single floating point exponent value.

18. The graphics adapter of claim 17, wherein the range component is equal to 1.0.

19. The graphics adapter of claim 17, wherein the output of the converter is suitable for storage in a frame buffer and wherein the rounding component shifts received values that are within a floating point range corresponding to a frame buffer code of x into an adjusted range bounded by floating point values $x/(2^n-1)$ and $(x+1)/(2^n-1)$, where n is the number of bits in each frame buffer value.

20. The graphics adapter of claim 19, wherein the rounding component is equal to $0.5(2n-1)^{-1}$.

21. The graphics adapter of claim 16, wherein the comparator circuitry includes a comparator configured to compare the exponent field of the adjusted input value to 0x7F.

22. The graphics adapter of claim 21, wherein the converter is configured to produce a frame buffer value of 0x00 if the exponent field is less than 0x7F.

23. The graphics adapter of claim 21, wherein the converter is configured to produce a frame buffer value of 0xFF if the exponent field is greater than 0x7F.

* * * * *

UNITED STATES PATENT AND TRADEMARK OFFICE
CERTIFICATE OF CORRECTION

PATENT NO. : 6,606,097 B1  Page 1 of 2
DATED : August 12, 2003
INVENTOR(S) : Gordon Clyde Fossum It is certified that error appears in the above-identified patent and that said Letters Patent is hereby corrected as shown below:

Title page,
Item [57], ABSTRACT, replace with the following:
--

A floating point to fixed point converter suitable for determining values for an n-bit frame buffer of a graphics adapter is disclosed. The converter includes a floating point unit that receives a floating point input value and calculates a floating point adjusted input value from the received value. Comparator circuitry is configured to compare a fixed point portion of the adjusted input value to a fixed point comparison value and to generate a fixed point output value responsive to the result of the comparison. The floating point unit may add a floating point constant to the received input to calculate the adjusted input value. The floating point constant may include a rounding component and a range component. The range component adjusts received values into a range defined by a single floating point exponent value such as the range from 1.0 to 2.0. In one embodiment, the rounding component shifts received values that are within a range of $x/(2^n-1) \pm 1/(2*2^n-1)$ into a range bounded by $x/(2^n-1)$ and $(x+1)/(2^n-1)$ to take advantage of special properties of the adjusted range's boundary values to simplify the comparator circuitry. The comparator circuitry may include a comparator configured to compare the exponent field of the adjusted input value to 0x7F and a comparator that compares the value of a first portion of the adjusted input value mantissa to a second portion of the mantissa. The [[ne]] converter may produce a frame buffer value of 0x00 if the exponent field is less than 0x7F and a frame buffer value of 0xFF if the exponent field is greater than 0x7F. The converter may generate a frame buffer equal to the value of the first portion of the adjusted input value mantissa if the first portion is greater than the second portion and a frame buffer equal to the value of the first portion decremented by one if the first portion is less than the second portion.

--

Column 4,
Lines 10-27, replace paragraph with the following:

-- A system memory (RAM) 106 is accessible to processors 102 via system bus 104. A host bridge 108 is connected between system bus 104 and an 1O bus 110. IO bus 110 is typically implemented as a PCI bus (as specified in *PCI Local Bus Specification Rev. 2.2* available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 112 that provides support for legacy IO devices such as a keyboard 124 and a mouse 126. System 100 further includes a graphics adapter 120 connected to IO bus 110. The graphics adapter 120 is enabled to process graphics data received via IO bus 110 and typically includes a video controller that controls the image displayed on a display device 121. --

UNITED STATES PATENT AND TRADEMARK OFFICE
CERTIFICATE OF CORRECTION

PATENT NO. : 6,606,097 B1
DATED : August 12, 2003
INVENTOR(S) : Gordon Clyde Fossum It is certified that error appears in the above-identified patent and that said Letters Patent is hereby corrected as shown below:

Column 12,
Lines 16-20, Claim 17 should read:

-- The graphics adapter of claim 16, wherein the floating point constant value includes a rounding component and a range component, wherein the range component adjusts received values into a range defined by a single floating point exponent value. --

Signed and Sealed this

Twentieth Day of January, 2004

JON W. DUDAS
*Acting Director of the United States Patent and Trademark Office*